United States Patent [19]

Freger

[11] Patent Number: 5,793,704
[45] Date of Patent: Aug. 11, 1998

[54] METHOD AND DEVICE FOR ULTRASONIC RANGING

[75] Inventor: David Freger, Ashkelon, Israel

[73] Assignee: Solid Scientific Research and Development Ltd., Tel Aviv, Israel

[21] Appl. No.: 763,377

[22] Filed: Dec. 13, 1996

[51] Int. Cl.⁶ ........................................ G01S 15/00
[52] U.S. Cl. .............................. 367/95; 367/98; 367/97; 367/908; 340/943; 340/621
[58] Field of Search ........................ 367/95, 97, 99, 367/908; 340/943, 435, 621

[56] References Cited

U.S. PATENT DOCUMENTS

| | | |
|---|---|---|
| 4,393,711 | 7/1983 | Lapides ........................... 73/592 |
| 4,428,237 | 1/1984 | Zeger et al. |
| 4,933,915 | 6/1990 | Bostrom ........................... 367/99 |
| 4,972,386 | 11/1990 | Lau ................................. 367/99 |
| 5,394,750 | 3/1995 | Matzuk ............................ 73/629 |

*Primary Examiner*—J. Woodrow Eldred
*Attorney, Agent, or Firm*—Mark M. Friedman

[57] ABSTRACT

A method and device for ultrasonic ranging. As in prior art devices, ultrasound pulses are transmitted by the device towards a target, and echo pulses from the target are received. The timing of the maximum of the amplitude envelope of the echo pulses is picked and used as a measure of the return time of these pulses. This maximum envelope time is relatively independent of the speed of sound between the device and the target. Preferably, the duration of the echo pulses is less than the response time of the receiving circuit, to enable an accurate pick of the amplitude envelope maximum.

23 Claims, 8 Drawing Sheets

METHOD AND DEVICE FOR ULTRASONIC RANGING

FIELD AND BACKGROUND OF THE INVENTION

The present invention relates to a method and device for inferring the distance to a target from the travel time of an ultrasonic pulse and, more particularly, to a method and device for measuring the distance to a target based on the time of arrival of the peak energy of an echoed pulse.

The use of ultrasound for rangefinding is well-known in the art. A pulse of ultrasound is transmitted towards a target, starting at an initial time $T_0$. An echo pulse from the target is detected, starting at a later time $T_1$. The round trip travel time, $T_1-T_0$, multiplied by the speed of sound in the medium through which the pulse propagates, gives twice the distance to the target.

This rangefinding method suffers from several sources of uncertainty, as illustrated in FIG. 1.

FIG. 1 shows two sources of error in determining the time $T_1$ at which the echo returns to the point of transmission. An echo waveform 10 is detected within a background of ambient noise having an RMS amplitude level labeled by the reference numeral 12. To be certain that incoming ultrasonic energy really is an echo pulse, and not noise, a received signal is ignored until its amplitude exceeds a threshold 14 that is considerably higher than the ambient noise. The time $T_2$ of the zero crossing 16 following the first detected amplitude that exceeds noise amplitude level 12 is used as the measured value of $T_1$. As can be seen in FIG. 1, $T_2$ includes two sources of error: the initial part of waveform 10 (in this example, two cycles of waveform 10), whose amplitude is less than threshold 14, is ignored; and the zero crossing at time $T_2$ is even later than the onset of a signal that is above threshold 12. These sources of error are most important at short ranges.

Another source of error is associated with the fact that the speed of sound through the medium of propagation may vary unpredictably. For example, if the transmitting medium is air, the speed of sound depends on air pressure, air temperature, and humidity along the path of sound propagation. If the air along the path of sound propagation were homogeneous, then the measuring device could be provided with pressure, temperature and humidity sensors to provide readings of pressure, temperature and humidity to be used to compensate for those variations. However, homogeneity of the medium of propagation cannot be guaranteed.

There is thus a widely recognized need for, and it would be highly advantageous to have, a method of ultrasonic ranging that is more immune to ambient noise and to variations in sound speed than the presently known method.

SUMMARY OF THE INVENTION

According to the present invention there is provided a method for measuring a distance to a target, comprising the steps of: (a) transmitting an ultrasound pulse towards the target; (b) receiving an echo pulse, having an amplitude envelope, from the target; and (c) picking an arrival time of a maximum of the amplitude envelope.

According to the present invention there is provided an ultrasonic rangefinder, comprising: (a) a transmitter of ultrasound pulses; (b) a sensor responsive to echoes of the pulses; (c) an amplifier receiving signals from the sensor; (d) an amplitude maximum detector receiving signals from the amplifier; and (e) a timer, operationally connected to the transmitter and to the receiver, whereby a time delay, between a transmission of one of the ultrasound pulses and a response of the amplitude maximum detector, is measured.

The principle upon which the present invention is based is illustrated in FIG. 2. The sensors used to detect ultrasonic echoes, whether those sensors be piezoelectric or magnetostrictive, all respond nonlinearly to the onset of ultrasonic energy. These sensors are characterized by a response time that is shorter for high-energy signals than for low-energy signals. Furthermore, the energy level of echo pulses propagating through air tends to vary in the opposite sense of the velocity of propagation: for a given level of transmission energy, an echo pulse returning through "slow" air tends to have a higher energy content than an echo pulse returning through "fast" air. FIG. 2 shows three echo pulses from a target through air of three different propagation velocities, as received by a receiving circuit. Echo pulse 20 returns through "fast" air. Echo pulse 30 returns through "average" air. Echo pulse 40 returns through "slow" air. The initial times of arrival of pulses 20, 30 and 40 differ accordingly, as shown; but because pulse 40 has higher energy than pulse 30, which in turn has higher energy than pulse 20, the receiving sensor responds more quickly to pulse 40 than to pulse 30, and more quickly to pulse 30 than to pulse 20. Consequently, the amplitude envelopes of the pulses, envelope 22 of pulse 20, envelope 32 of pulse 30, and envelope 42 of pulse 40, have their maxima at approximately the same time. Therefore, a range measurement based on picking the maximum of the amplitude envelope of the received echo pulse is relatively immune to variations in sound speed. In addition, the maximum amplitude generally greatly exceeds the ambient noise level, making the method of the present invention immune to the systematic errors associated with picking the initial zero crossing of the echo pulse.

In order for the maximum of the amplitude envelope to be picked reliably, the echo pulse preferably is shorter than the response time of the receiving sensor. In longer pulses, the location of the maximum of the amplitude envelope tends to be ambiguous. If the receiving sensor has a response time shorter than the length of the echo pulse, then the receiving circuit can be provided with an effective response time that is longer than the pulse length, by including, in the receiving circuit, a suitable nonlinear device such as a bandpass filter.

Because the sensor response, upon which the present invention is based, varies among sensor types, a rangefinder built according to the principles of the present invention must be calibrated by transmitting ultrasonic pulses towards calibration targets at known distances and measuring the times of maximum amplitude of the received echo pulses. This calibration preferably includes a measurement of the amplification level in the receiving circuit that is just short of the saturation level of the receiving circuit, at each calibration distance. This provides a table of optimum amplification levels vs. distance. In actual use, the rangefinder measures distance to a target using at least two transmitted pulses. The first pulse is used to get a rough estimate of distance to the target. The amplification level is adjusted to match this estimate, so that as high an amplitude as possible can be used for picking the maximum of the echo envelope without saturating the receiving circuit. Then a second pulse is transmitted, for the actual distance measurement.

Alternatively, amplitude measurement and feedback may be provided to reduce the receiver amplification if the received echo signal saturates the receiver circuit.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method and device for ultrasonic rangefinding. Specifically, the present invention can be used to measure accurately the distance to a target, in the presence of relatively high ambient noise, despite variations in the speed of sound between the device and the target.

The principles and operation of an ultrasonic rangefinder according to the present invention may be better understood with reference to the drawings and the accompanying description.

Figure 3:
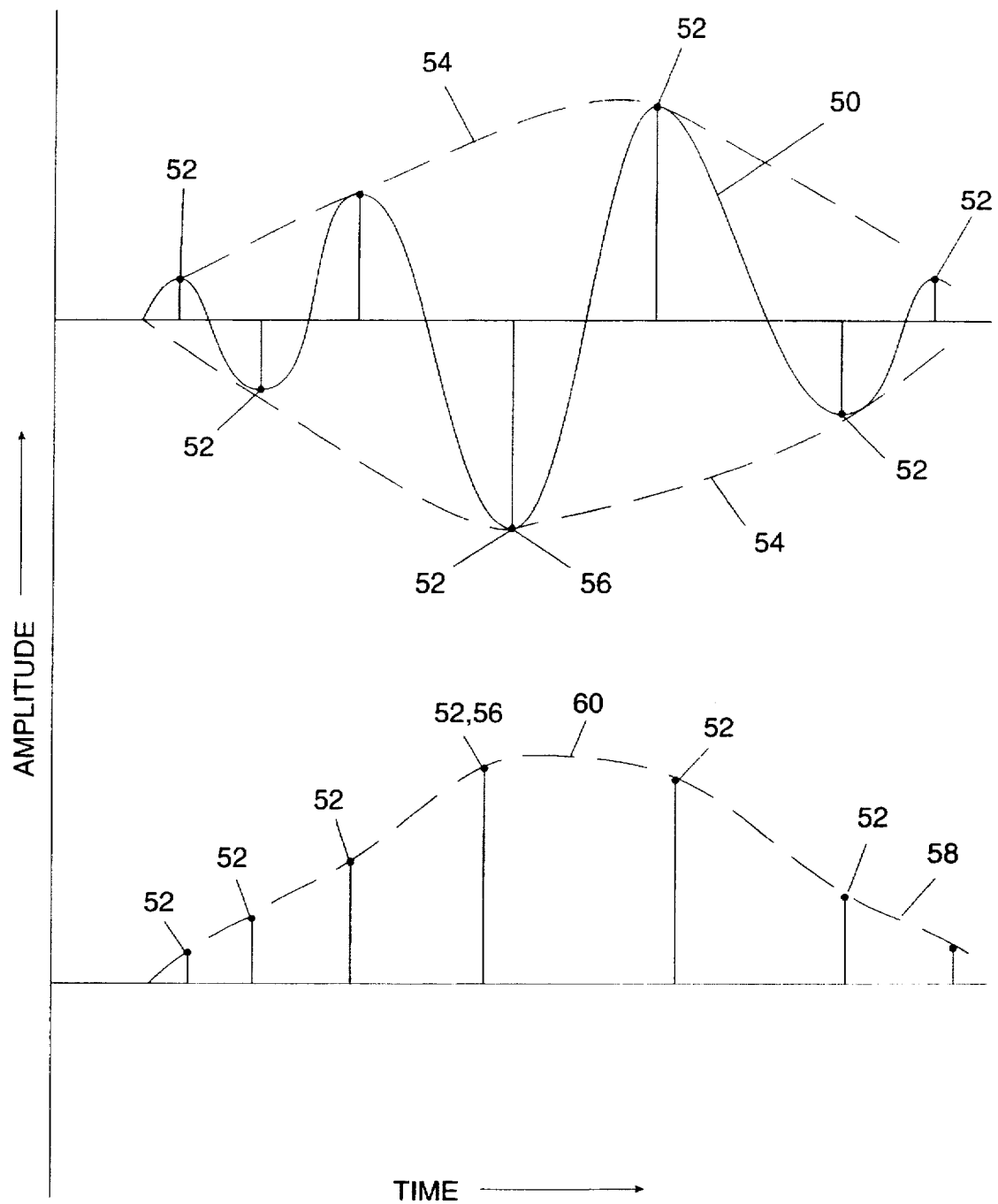
FIG. 3 illustrates two algorithms for picking the maximum of the amplitude envelope of an echo pulse.

Referring now to the drawings. FIG. 3 shows a received echo pulse 50, showing that each half-cycle of pulse 50 features a point of maximum absolute amplitude 52. The simplest way to pick the time of the maximum of the amplitude envelope 54 of pulse 50 is to pick the time of the largest maximum absolute amplitude 56. Distances measured in this way are uncertain by one quarter of the ultrasound wavelength. A more accurate distance measurement can be obtained by fitting a smooth curve 58 to the maximum absolute amplitudes, as shown, and picking the maximum 60 of curve 58.

Figure 1:
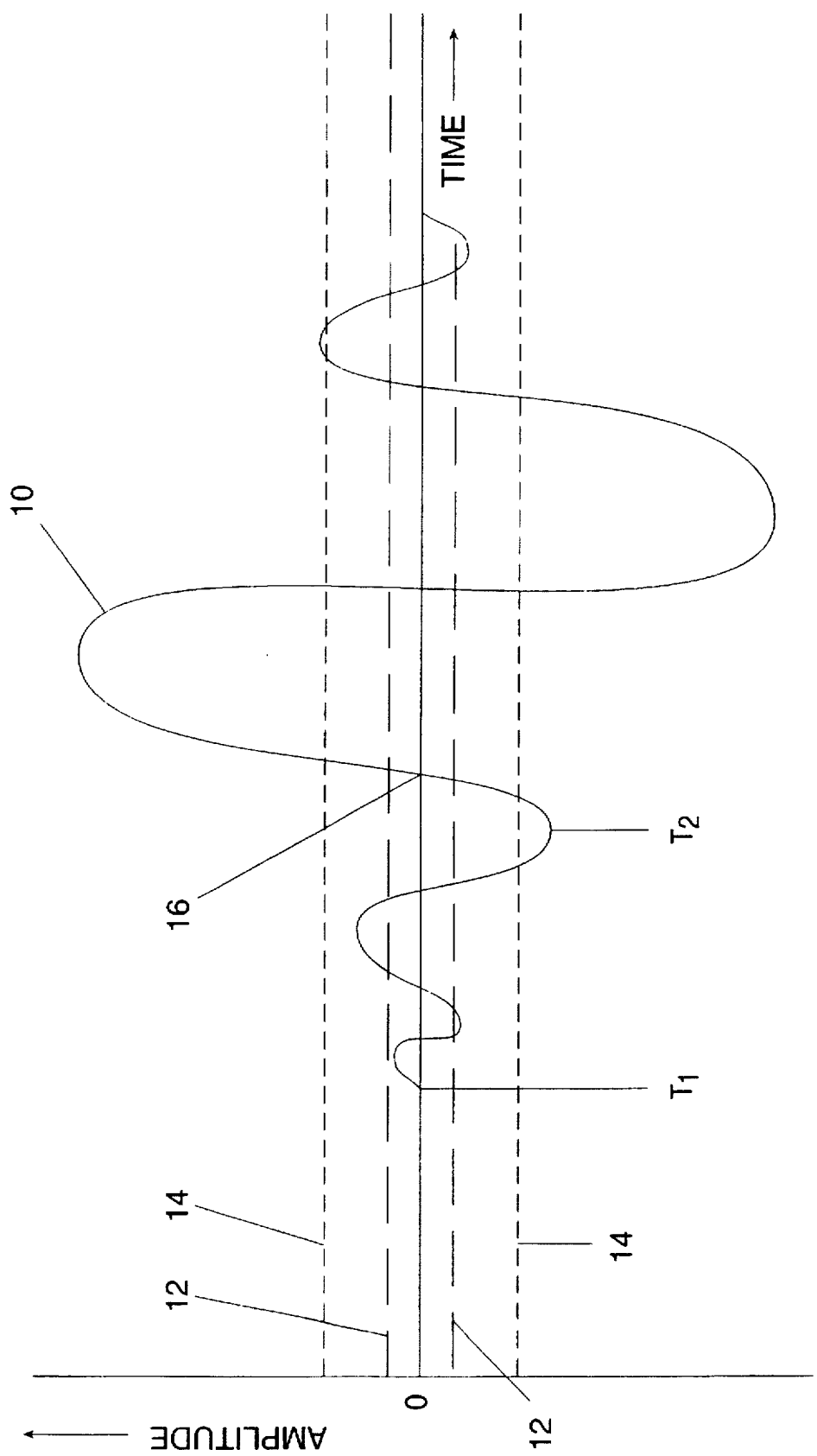
FIG. 1 (prior art) illustrates the picking of the first zero crossing of an echo pulse.
Figure 2:
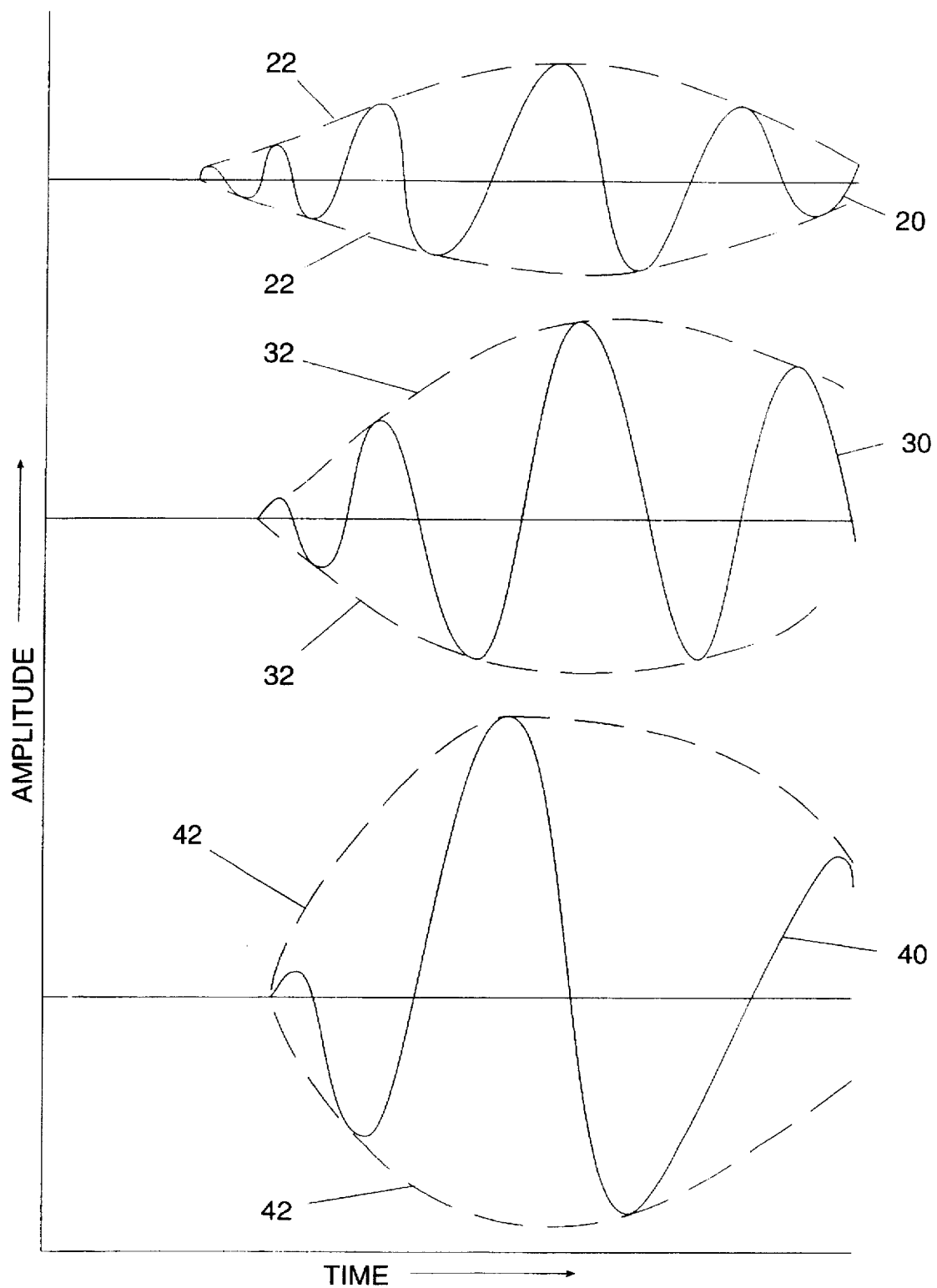
FIG. 2 shows three echo pulses as received by the receiver circuit of the present invention after propagation to and from the same target but through media (air) of different propagation velocities.
Figure 4:
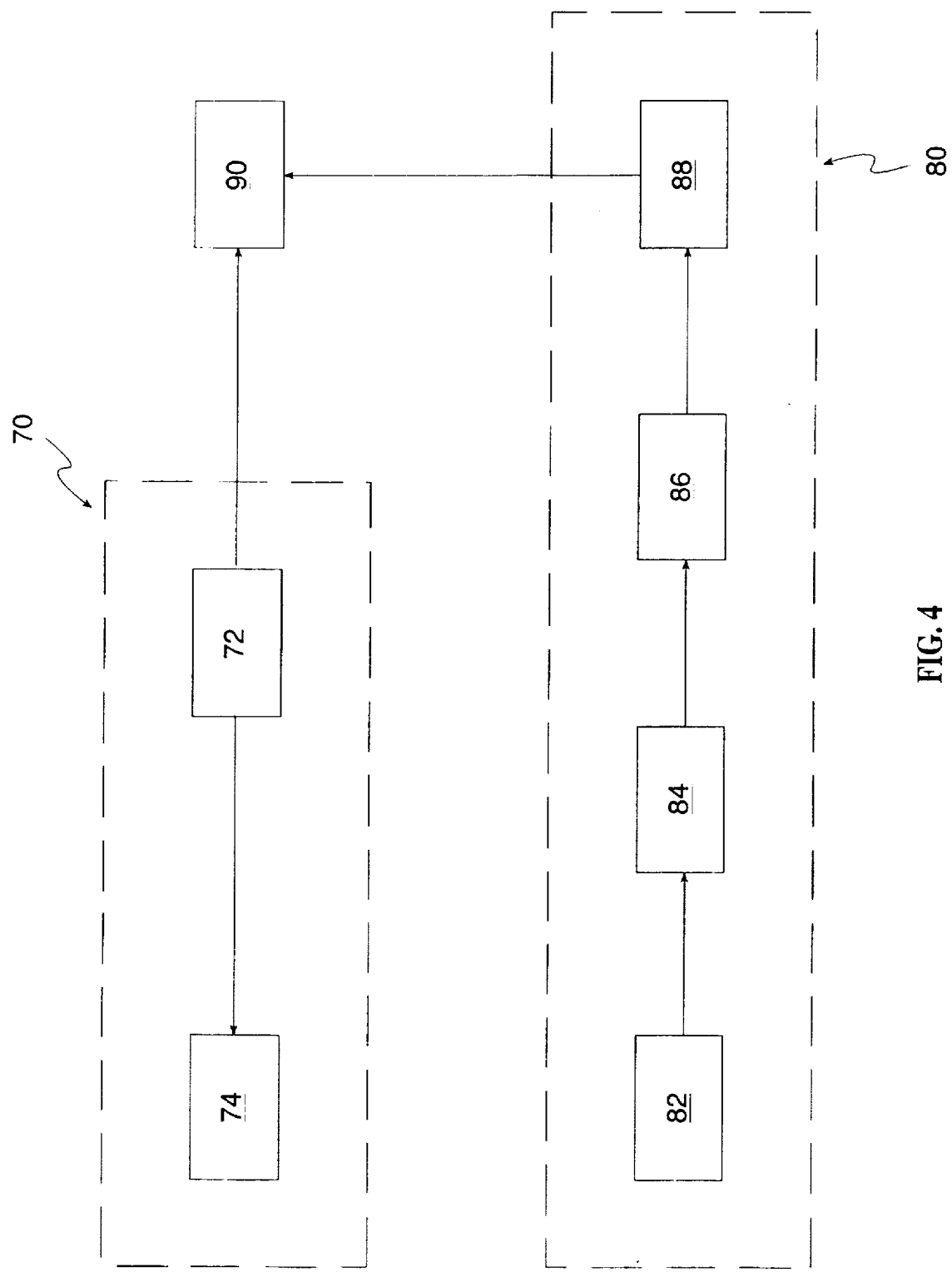
FIG. 4 is a block diagram of a basic rangefinder according to the present invention.

FIG. 4 is a block diagram of a basic rangefinder according to the present invention. A transmitter 70 includes a signal generator 72 and an ultrasound transducer 74. Signal generator 72 generates waveforms that are transmitted as pulses of ultrasound by transducer 74. Echo pulses returning from the target are received by a receiver circuit 80 that includes a sensor 82, an amplifier 84, an amplitude detector 86, a peak amplitude detector 88, and a timer 90. The arrows show the direction of signal flow. Sensor 82 receives ultrasound energy and transforms it into electrical signals, which are amplified by amplifier 84 and passed on to amplitude detector 86. Peak amplitude detector 88 responds to signal maxima 52, from amplitude detector 86, that exceed a threshold such as threshold 14 of FIG. 1, and signals timer 90 when maxima 52 are received, as long as the associated amplitudes are increasing. The last such timing signal from peak amplitude detector 88 is the one associated with largest maximum absolute amplitude 56. Timer 90 also receives a timing signal from signal generator 72 during the transmission of the outgoing ultrasound pulse. Preferably, this signal is sent from signal generator 72 to timer 90 when signal generator 72 begins to generate the transmitted waveform; but other fiducial points of the transmitted waveform, such as the first peak or the first zero crossing, also may be used to mark the nominal start of transmission Timer 90 includes circuitry for inferring the distance to the target, based on the time difference between the timing signal from signal generator 72 and the last timing signal from peak amplitude detector 88. A signal representative of this difference is sent to other devices (not shown) such as a display.

Figure 5:
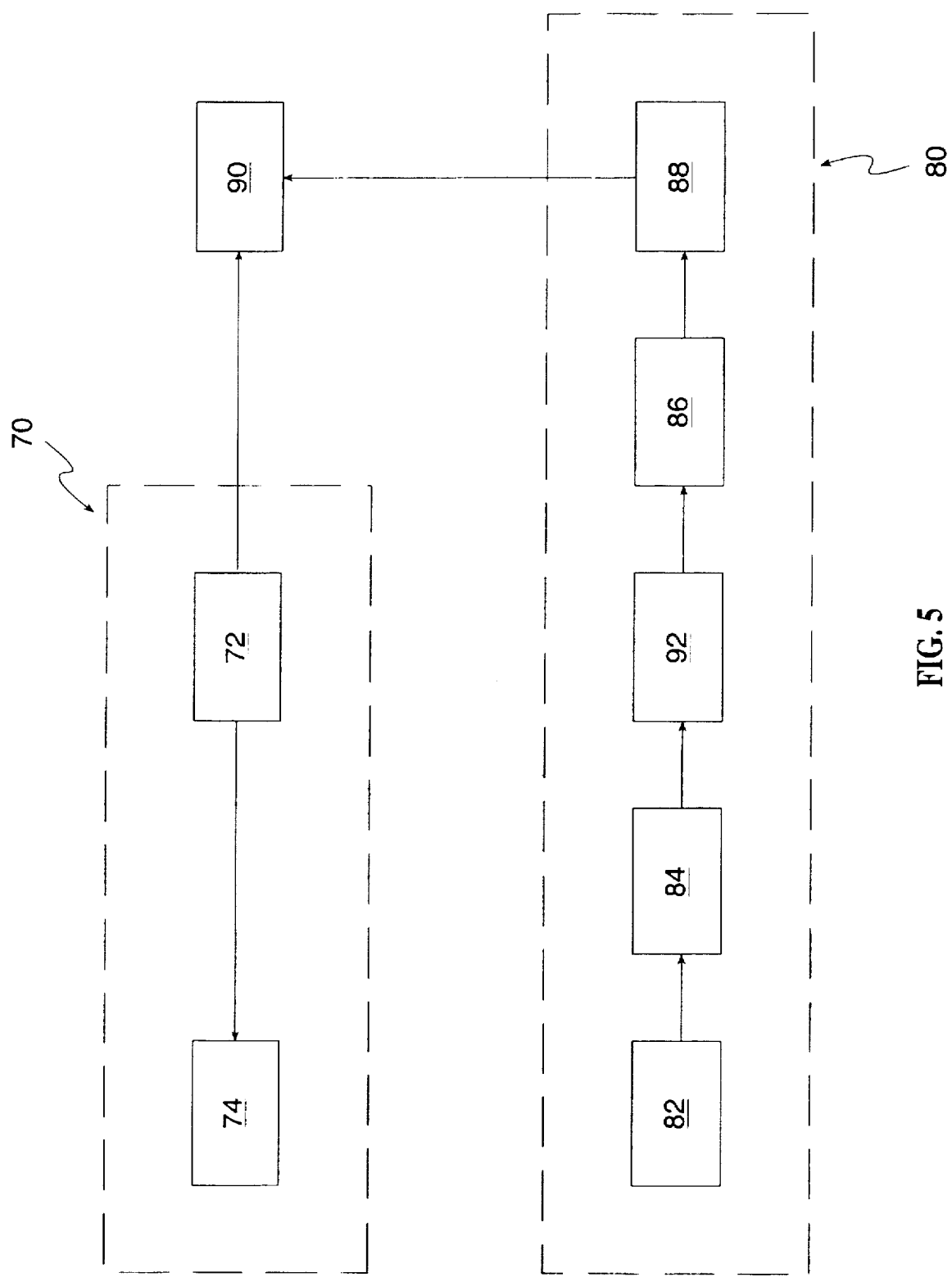
FIG. 5 is a block diagram of a rangefinder according to the present invention that includes a nonlinear device for adjusting the response time of the receiver circuit.

FIG. 5 is a block diagram of a rangefinder according to the present invention, similar to the rangefinder of FIG. 4, in which a non-linear device 92 such as a bandpass filter is interposed between amplifier 84 and amplitude detector 86. The purpose of non-linear device 92, as described above, is to ensure that the response time of receiver circuit 80 is greater than the duration of the signals transmitter 70, even if the response time of sensor 82 itself is shorter than those signals.

Figure 6:
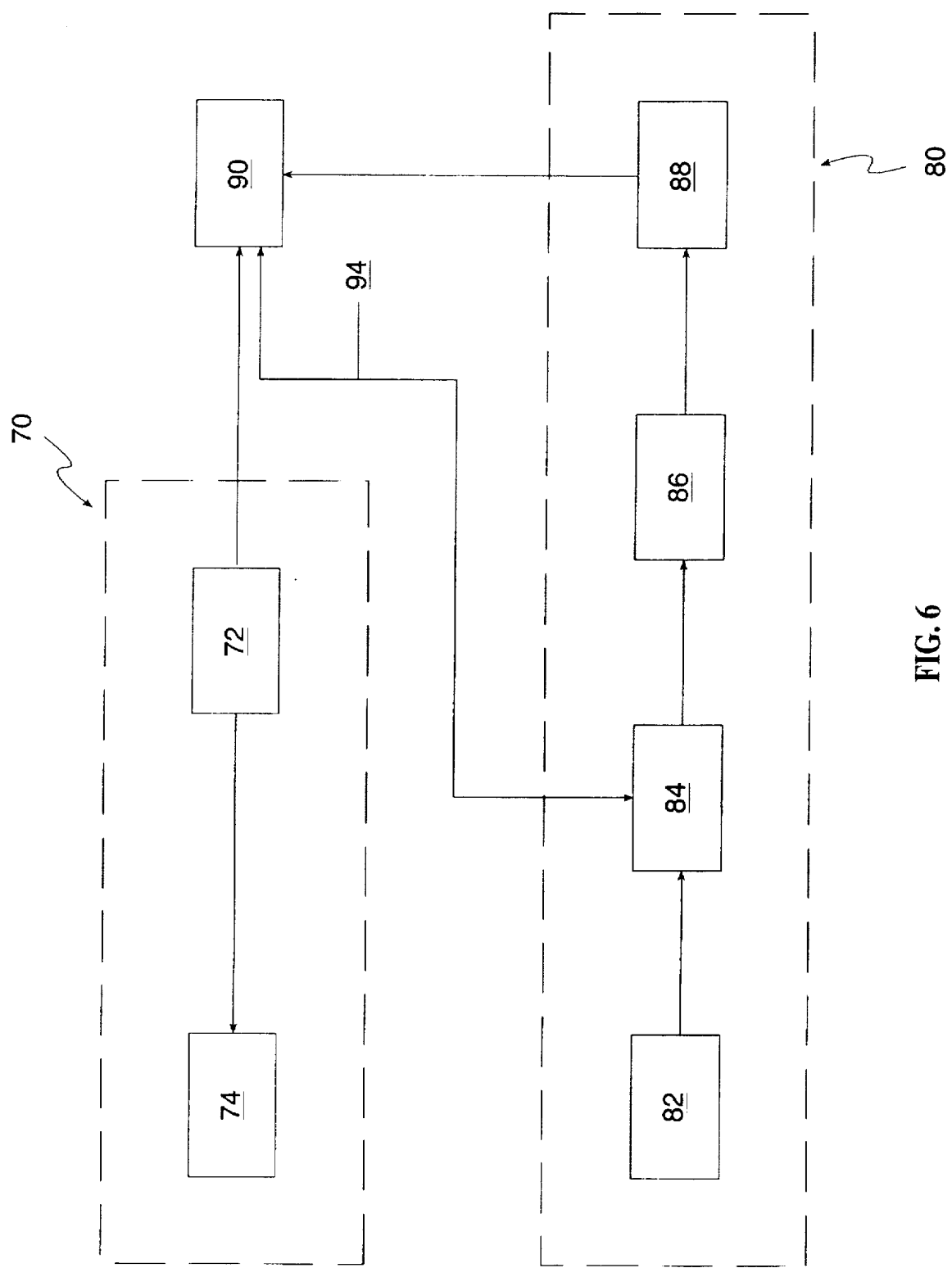
FIG. 6 is a block diagram of a rangefinder according to the present invention that includes a feedback mechanism for adjusting the receiver circuit amplifier in accordance with an estimated distance to the target.
Figure 7:
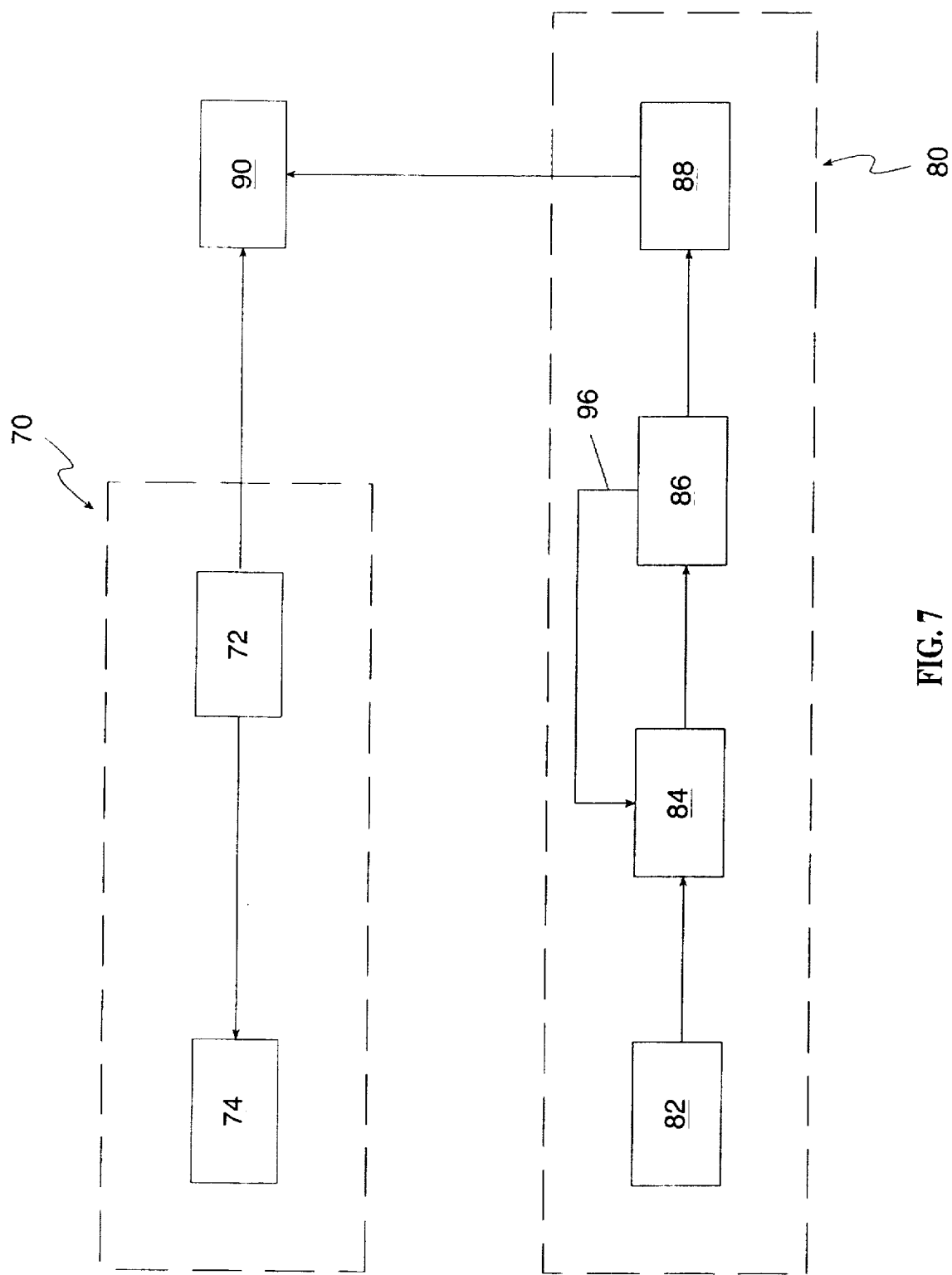
FIG. 7 is a block diagram of a rangefinder according to the present invention that includes a feedback mechanism for adjusting the receiver circuit amplifier in accordance with the received amplitude.
Figure 8:
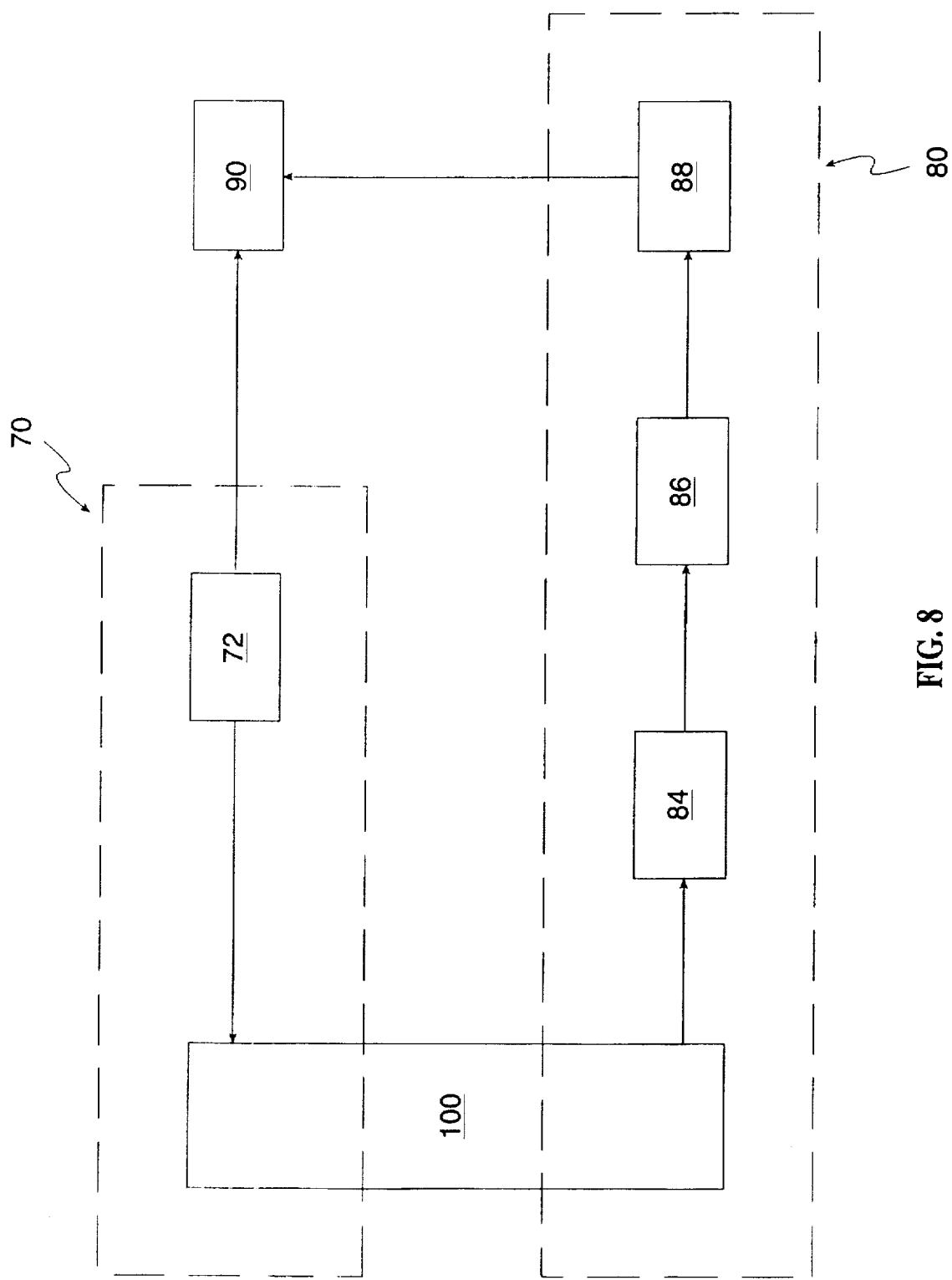
FIG. 8 is a block diagram of a rangefinder according to the present invention in which the transmitting transceiver and the receiving sensor are identical.

FIG. 6 is a block diagram of a rangefinder according to the present invention, similar to the rangefinder of FIG. 4, in which a feedback mechanism, symbolized by arrow 94, is provided for controlling the amplification level of amplifier 84, as described above, to keep largest maximum amplitude 56 just below the saturation level of receiver circuit 80. FIG. 7 is a block diagram of a rangefinder according to the present invention, similar to the rangefinder of FIG. 6, except that a feedback mechanism 96 is provided to adjust the amplification level of amplifier 84 based on the amplitudes actually measured by amplitude detector 86. Finally, FIG. 8 is a block diagram of a rangefinder according to the present invention, similar to the rangefinder of FIG. 4, in which the same physical device 100 (e.g., the same piezoelectric crystal) is used as both the transducer of transmitter 70 and the sensor of receiver circuit 80. The advantages of using the same physical device for both the transducer of transmitter 70 and the sensor of receiver circuit 80 is that the rangefinder then is both more compact and more economical to produce than a rangefinder with a separate transducer 74 and sensor 82.

While the invention has been described with respect to a limited number of embodiments, it will be appreciated that many variations, modifications and other applications of the invention may be made.

What is claimed is:

1. A method for measuring a distance to a target, comprising the steps of:

(a) transmitting an ultrasound pulse towards the target;

(b) receiving an echo pulse, having an amplitude envelope, from the target, said receiving being effected using a sensor having a nonlinear response to said echo pulse; and (c) picking an arrival time of a maximum of said amplitude envelope.

2. The method of claim 1, wherein said echo pulse includes a plurality of half-cycles, each of said half-cycles having a maximum absolute amplitude, said measure of said maximum of said amplitude envelope being a largest of said maximum absolute amplitudes.

3. The method of claim 1, wherein said echo pulse includes a plurality of half-cycles, each of said half-cycles having a maximum absolute amplitude, said maximum of said amplitude envelope being determined by fitting a smooth curve to said maximum absolute amplitudes as a function of time.

4. The method of claim 1, wherein said receiving is effected using a receiver circuit having a saturation level and an amplification level, the method further comprising the step of:

(d) if said maximum of said amplitude envelope exceeds said saturation level: decreasing said amplification level.

5. The method of claim 1, wherein said receiving is effected using a sensor having a sensor response time, and wherein said echo pulse has a pulse duration shorter than said sensor response time.

6. The method of claim 1, wherein said echo pulse has a pulse duration, wherein said receiving is effected using a receiver circuit having an adjustable circuit response time, the method further comprising the step of:

(e) adjusting said receiver circuit response time to be longer than said pulse duration.

7. The method of claim 6, wherein said adjusting of said receiver circuit response time is effected using a nonlinear device in said receiver circuit.

8. The method of claim 7, wherein said nonlinear device is a bandpass filter.

9. The method of claim 1, further comprising the steps of calibrating the method by:

(d) transmitting said ultrasound pulse towards a calibration target of known calibration distance;

(e) receiving a calibration echo pulse, having an amplitude envelope, from said calibration target; and (f) picking an arrival time of a maximum of said amplitude envelope of said calibration echo pulse.

10. The method of claim 9, wherein said receiving is effected using a receiver circuit having a saturation level and an amplification level, and wherein said transmission of said ultrasound towards a calibration target of known distance is effected at a plurality of said known distances, the method further comprising the steps of:

(g) for each of said known distances, determining an optimal amplification level such that said maximum of said amplitude envelope of said calibration echo pulse is less than said saturation level, thereby creating a table of said optimal amplification level as a function of calibration distance; and (h) after receiving said echo pulse and identifying said arrival time of said maximum of said amplitude envelope, adjusting said amplification level, in accordance with said table of optimal amplification level as a function of calibration distance, and in accordance with a measured distance inferred from said arrival time of said maximum of said amplitude envelope.

11. An ultrasonic rangefinder, comprising:

(a) a transmitter of ultrasound pulses;

(b) a receiver including:

(i) a sensor responsive to echoes of said pulses, (ii) an amplifier receiving signals from said sensor, and (iii) an amplitude maximum detector receiving signals from said amplifier;

(c) a timer, operationally connected to said transmitter and to said receiver, whereby a time delay, between a transmission of one of said ultrasound pulses and a response of said amplitude maximum detector, is measured; and (d) a feedback mechanism for adjusting said amplifier based on said time delay.

12. The rangefinder of claim 11, further comprising:

(e) a nonlinear device, operationally interposed between said amplifier and said amplitude maximum detector.

13. The rangefinder of claim 12, wherein said nonlinear device is a bandpass filter.

14. The rangefinder of claim 11, further comprising:

(f) an amplitude detector, operationally interposed between said amplifier and said amplitude maximum detector, whereby amplitudes of said signals from said amplifier are measured; and (f) a feedback mechanism for adjusting said amplifier based on said measured amplitudes.

15. The rangefinder of claim 11, wherein said transmitter includes a transducer for generating said ultrasound pulses.

16. The rangefinder of claim 15 wherein said transducer and said sensor are identical.

17. A method for measuring a distance to a target, comprising the steps of:

(a) transmitting an ultrasound pulse towards a calibration target of known calibration distance;

(b) receiving a calibration echo pulse, having an amplitude envelope, from said calibration target;

(c) picking an arrival time of a maximum of said amplitude envelope of said calibration echo pulse;

(d) transmitting said ultrasound pulse towards the target;

(e) receiving a first measurement echo pulse, having an amplitude envelope, from the target; and (f) picking an arrival time of a maximum of said amplitude envelope of said first measurement echo pulse.

18. The method of claim 17, wherein said receiving is effected using a receiver circuit having a saturation level and an amplification level, and wherein said transmission of said ultrasound towards a calibration target of known distance is effected at a plurality of said known distances, the method further comprising the steps of:

(g) for each of said known distances, determining an optimal amplification level such that said maximum of said amplitude envelope of said calibration echo pulse is less than said saturation level, thereby creating a table of said optimal amplification level as a function of calibration distance; and (h) after receiving said first measurement echo pulse and identifying said arrival time of said maximum of said amplitude envelope of said first measurement echo pulse, adjusting said amplification level, in accordance with said table of optimal amplification level as a function of calibration distance, and in accordance with a measured distance inferred from said arrival time of said maximum of said amplitude envelope of said first measurement echo pulse.

19. The method of claim 18, wherein said transmitting of said ultrasound pulse towards the target is effected at least twice, the method further comprising the steps of:

(i) receiving a second measurement echo pulse, having an amplitude envelope, from the target; and (j) picking an arrival time of a maximum of said amplitude envelope of said second measurement echo pulse.

20. A method for measuring a distance to a target, comprising the steps of:

(a) transmitting an ultrasound pulse towards the target, said pulse having a certain waveform;

(b) timing a fiducial point associated with initialization of said waveform;

(c) receiving an echo pulse, having an amplitude envelope, from the target; and (d) picking an arrival time of a maximum of said amplitude envelope, said picking being based on a feature of said amplitude envelope.

21. The method of claim 20, wherein said fiducial point is an initial point of said waveform.

22. The method of claim 20, wherein said fiducial point is a first peak of said waveform.

23. The method of claim 20, wherein said fiducial point is a first zero crossing of said waveform.

* * * * *